United States Patent [19]

Jones et al.

[11] Patent Number: 5,573,214
[45] Date of Patent: Nov. 12, 1996

[54] CUP HOLDER FOR USE IN VEHICLES

[75] Inventors: Stephen W. Jones, Emporia; Don G. Sneed, Overland Park; David D. McCormick, Prairie Village; Donald L. Rohrs, Overland Park, all of Kans.

[73] Assignee: Jasco, Inc., Emporia, Kans.

[21] Appl. No.: 333,067

[22] Filed: Nov. 1, 1994

[51] Int. Cl.⁶ ........................................... A47K 1/08
[52] U.S. Cl. .................................. 248/311.2; 248/205.5; 248/316.4; 248/558
[58] Field of Search ............................... 248/311.2, 154, 248/313, 316.4, 231.4, 205.5, 206.2, 558, 911, 214, 670; 224/926

[56] References Cited

U.S. PATENT DOCUMENTS

| | | | |
|---|---|---|---|
| D. 251,229 | 3/1979 | Wooters | D7/70 |
| 1,899,480 | 2/1933 | Ravlin . | |
| 2,157,001 | 5/1939 | Morley | 248/206 |
| 2,189,607 | 2/1940 | Krischke | 311/22 |
| 2,488,263 | 11/1949 | Bishman | 224/42.44 |
| 2,503,602 | 4/1950 | Titley | 5/94 |
| 2,698,155 | 12/1954 | Bowman | 248/311 |
| 2,770,411 | 11/1956 | MacKay | 229/43 |
| 3,036,717 | 5/1962 | Johnson | 248/311.2 |
| 3,052,506 | 11/1962 | Thomas | 311/22 |
| 3,084,764 | 4/1963 | Duffey et al. | 187/8.41 |
| 3,229,946 | 1/1966 | MacKay | 248/311 |
| 3,273,841 | 9/1966 | Cota | 248/154 |
| 4,620,488 | 11/1986 | Formo | 108/47 |
| 4,776,623 | 10/1988 | Manning | 294/143 |
| 4,813,582 | 3/1989 | Henricksen et al. | 224/42.43 |
| 4,846,429 | 7/1989 | Scheurer et al. | 248/205.8 |
| 4,903,872 | 2/1990 | Henricksen et al. | 224/42.43 |
| 4,943,111 | 7/1990 | Vanderaan | 297/194 |
| 5,028,026 | 7/1991 | Philipps et al. | 248/206.2 |
| 5,033,709 | 7/1991 | Yuen | 248/311.2 |
| 5,040,756 | 8/1991 | Via Cava | 248/103 |
| 5,042,770 | 8/1991 | Louthan | 248/311.2 |
| 5,072,909 | 12/1991 | Huang | 248/311.2 |
| 5,149,032 | 9/1992 | Jones et al. | 248/154 |
| 5,280,870 | 1/1994 | Chick et al. | 248/311.2 |
| 5,390,837 | 2/1995 | Ruffolo, Jr. | 224/42.45 R |

FOREIGN PATENT DOCUMENTS 433543  7/1991  European Pat. Off. ............... 224/926

*Primary Examiner*—Karen J. Chotkowski
*Assistant Examiner*—Anita M. King
*Attorney, Agent, or Firm*—Hovey, Williams, Timmons & Collins

[57] ABSTRACT

A cup holding assembly for use in vehicles includes a strap having upper and lower ends, a cup holder, a support means for supporting the cup holder on the strap, at least one mounting means for mounting the assembly to any of a number of interior vehicle structures, and a leveling means for adjusting the orientation of the cup holder with respect to the vehicle. A first mounting means is provided adjacent the upper end of the strap, and includes a tongue protruding downward from the upper end, the strap and the tongue defining a hook, a suction cup, and a clip means for clipping the suction cup to the upper end. The first mounting means allows the assembly to be mounted to a door of the vehicle having a shiftable window and space for receiving the shiftable window. A second mounting means may be provided adjacent the lower end, and includes a mounting clip which engages a headrest support for mounting the assembly on the headrest support. A third mounting means includes a suction cup, and a coupling structure for coupling the suction cup to the strap. The third mounting means may be used to mount the assembly on a window or other non-porous surface. The support means includes transverse fingers on the strap which frictionally engage notches on the cup holder. The transverse fingers are configured so that the strap may be reversed, thereby reversing the upper and lower end of the strap with respect to the cup holder.

24 Claims, 4 Drawing Sheets

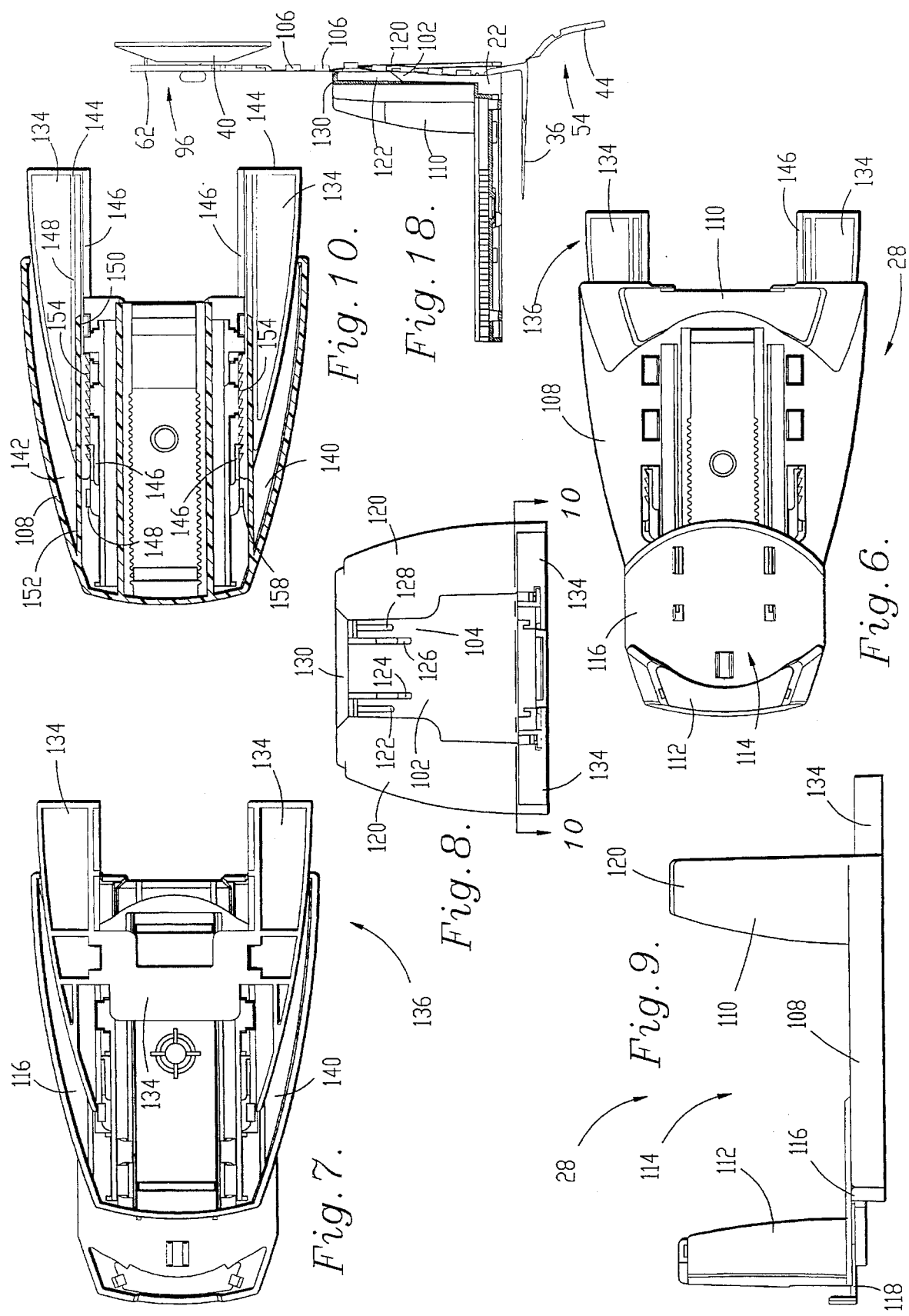

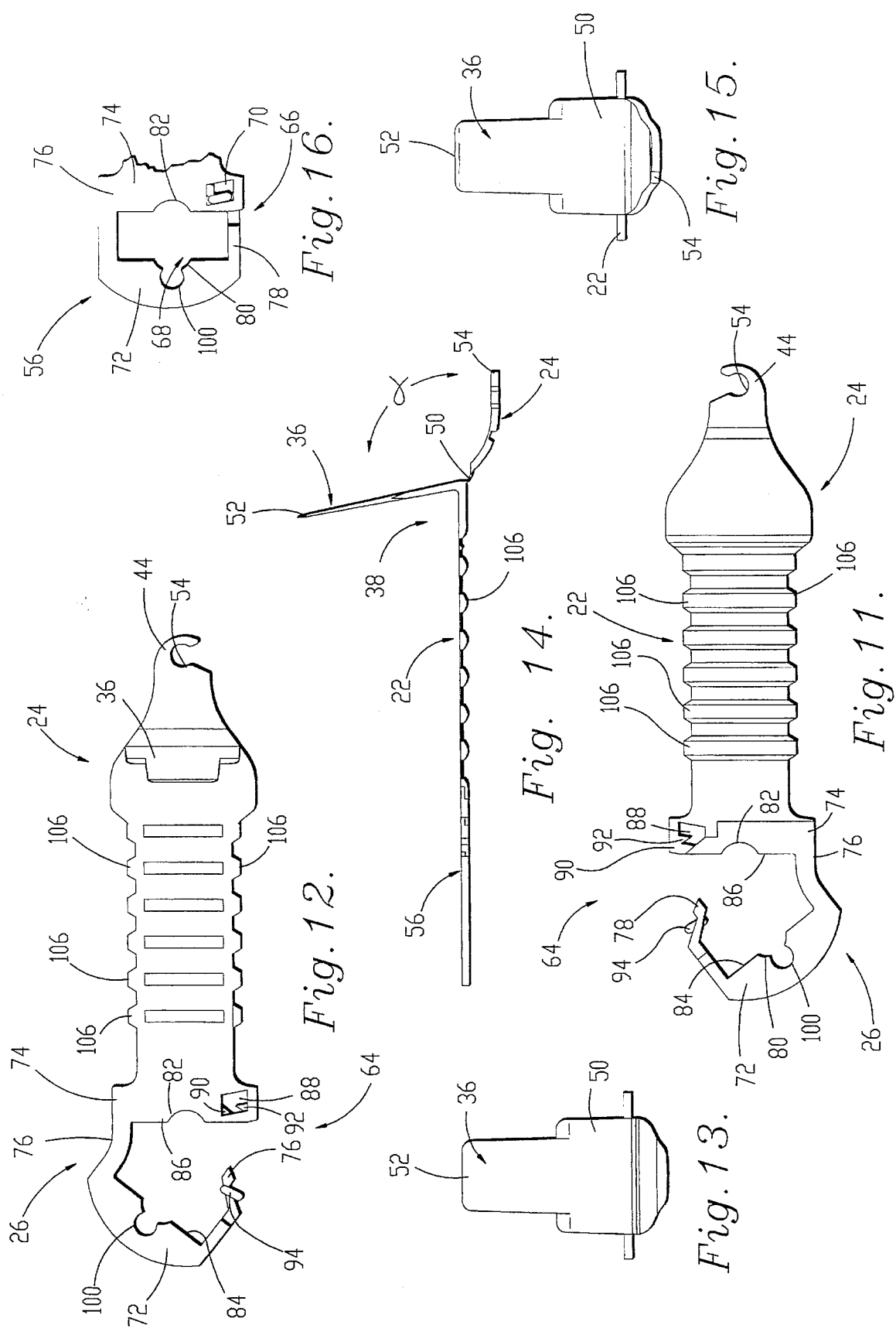

CUP HOLDER FOR USE IN VEHICLES

BACKGROUND OF THE INVENTION

1. Field of the Invention

The present invention relates to cup holding devices, and particularly cup holding devices which may be attached to various interior structures of a vehicle. More particularly, the cup holding assembly for use in vehicles includes a specialized strap for supporting a cup holder and mounting the assembly upon vehicular structure, such as a vehicle door, headrest support, or window.

2. Description of the Prior Art

Various automotive cup holder devices used to support a cup and its contents are known in the art. For example, U.S. Pat. No. 2,698,155 issued to Bowman, entitled "Receptacle for Use in Motor Vehicles" (the "'155 Patent"), teaches the use of a container portion which is affixed to a rising flexible arm of fixed length. The arm has a suction cup and a hook at its upper end for mounting the receptacle on an automotive dashboard or window. This type of suction cup supported receptacle may become detached by a small air leak in the suction cup or excessive force in either a horizontal or vertical direction, resulting in spillage of the contents of the cup.

U.S. Pat. No. 5,149,032 issued to Jones et al, entitled "Universal Cup Holder For Use In Vehicles" (the "'032 Patent"), teaches the use of a cup holder having at least one shiftable arm that serves to adjust the size of a cup holding compartment. A lockable ratcheting pawl mechanism controls the arm to redefine the size of a cup receiving area or compartment. The '032 Patent represents a significant advance in the art by providing a container compartment of variable size, which reduces the incidence of spillage.

The cup holder of the '032 Patent is not designed to hang from a strap. Instead, it includes a leg that may be received, for example, between automotive seat cushions for support.

Several problems arise in the use of these automotive cup holders. Momentum resulting from common vehicular acceleration forces caused by turning, stopping, and starting tends to induce spillage of the cup and its contents. Holders that are supported by a strap typically do not rest in a level orientation and have excessive free-play. Also, the straps typically have non-interchangeable mounting structure for connection to the vehicle, which limits the locations where the holders may be installed.

One especially significant problem involves the lack of a convenient, reliable mounting system. No one strap-mounted device combines the convenient positioning of a suction cup with the reliability of a rigid mounting system such as a hook or a bracket. Additionally, no strap mounted device exists which may be alternatively affixed to a door, a window, or other interior structure, such as a headrest support.

SUMMARY OF THE INVENTION

It is an object of the cup holding assembly of the present invention to provide a strap for supporting a cup holder and further providing a mounting means for rigidly mounting the assembly to any of a number of structures in the interior of a vehicle, such as a door, a headrest support, or a window.

It is another object of the present invention to provide a strap which may be reversed with respect to the cup holder.

It is a further object of the present invention to provide a strap which may support the cup holder at various heights relative to the structure to which the strap is mounted.

It is yet another object of the present invention to provide a leveling means for leveling the cup holder when it is supported by the strap.

In broad terms, the cup holding assembly of the present invention comprises a strap including upper and lower ends, a cup holder, a support means for supporting the cup holder on the strap, and at least one mounting means for mounting the assembly to the interior of a vehicle.

A first mounting means may be provided adjacent the upper end for mounting the assembly to the door of a vehicle, the door having a window and a space for receiving the window. The first mounting means includes a tongue protruding downward from the upper end of the strap and is sized for being received in the space of the door, the tongue and strap defining a hook; a suction cup; and a clip means extending upward from the upper end for connecting the suction cup to the upper end.

A second mounting means may be provided adjacent the lower end for mounting the assembly to interior structure of a vehicle, such as a headrest support. The second mounting means includes a headrest support mounting clip changeable between an open and closed condition, the mounting clip defines an aperture when it is in the closed condition, and a retaining means for retaining the mounting clip in a closed condition.

A third mounting means may be provided for mounting the assembly to the window of a vehicle by including a suction cup, and coupling structure defined in the mounting clip of the second mounting means for coupling the suction cup with the mounting clip.

Preferably, the strap is substantially flat and includes at least one transverse finger intermediate the upper and lower ends. The cup holder includes notches which are engageable by the transverse finger of the strap for supporting the cup holder on the strap. Multiple transverse fingers may be provided to allow adjustment of the height of the cup holder with respect to the strap.

The transverse finger also allows the strap to be reversed, thereby reversing the position of the upper and lower ends with respect to the cup holder. This feature allows the alternative mounting means to be employed.

The cup holder includes a base, and two arms defining a cup receiving area. Preferably, at least one arm is adjustable so that the size of the cup receiving area may be adjusted, thereby allowing cups of different sizes to be held. The cup holder may be provided with a rack and pawl mechanism for selectively re-sizing the cup receiving area.

A leveling means for adjusting the orientation of the cup holder with respect to the vehicle may also be provided including a leg member adjustably mounted on the cup holder for movement parallel to the base between a retracted position and an extended position. In the retracted position, the leg member is withdrawn beneath the base, while in the extended position, the leg member protrudes from the base and engages the vehicle. The cup holder may be provided with a rack and pawl mechanism for selectively positioning the leg member.

BRIEF DESCRIPTION OF THE DRAWING FIGURES

A preferred embodiment of the invention is described in detail below with reference to the attached drawing figures, wherein:

FIG. 6 is a top plan view of the cup holder with leg member in the extended position;

FIG. 7 is a bottom plan view thereof;

FIG. 8 is a rear elevational view thereof, illustrating the transverse finger receiving notches;

FIG. 9 is a right side elevational view thereof, illustrating the adjustable arm in the extended position, and the cup receiving area;

FIG. 10 is a sectional view taken along line 10—10 of FIG. 8, depicting a rack and pawl guide mechanism that serves to lock the leg member in a selectively extended position;

FIG. 11 is a front view of the strap illustrating the transverse fingers, upper and lower ends, and the various mounting means, with the headrest support mounting clip in the open condition;

FIG. 12 is a rear view thereof;

FIG. 13 is a bottom end view illustrating a door space engaging tongue and the dual pronged C-clip of FIG. 11;

FIG. 14 is a side view of the FIG. 11 strap, with the opposed side being a mirror image thereof;

FIG. 15 is a top end view of the strap of FIG. 11;

FIG. 16 is a rear view of the headrest support mounting clip in a locked condition;

FIG. 18 is a sectional view taken along line 18—18 of FIG. 5.

DETAILED DESCRIPTION OF THE PREFERRED EMBODIMENT

Figure 1:
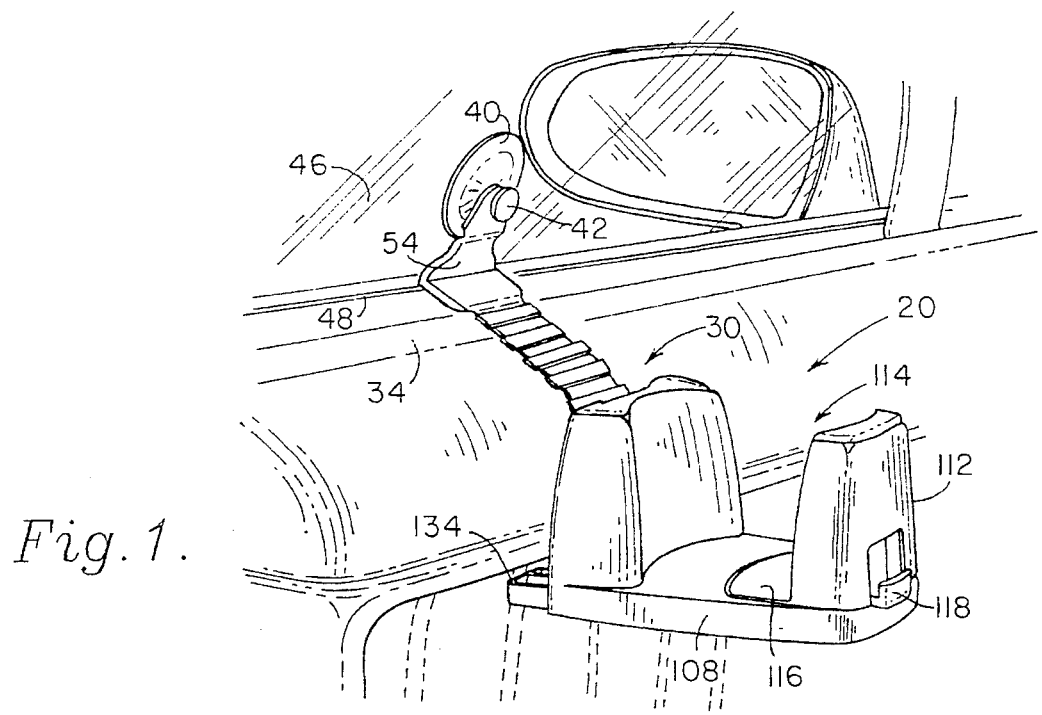
FIG. 1 is a perspective view of a cup holding assembly constructed in accordance with the preferred embodiment mounted on the door of a vehicle with the leg member engaging the door.

Turning now to the drawing figures, cup holding assembly 20 comprises strap 22 including upper end 24 and lower end 26, cup holder 28, support means 30 for supporting cup holder 28 on strap 22, and at least one mounting means for mounting assembly 20 to the interior structure of a vehicle. Strap 22 may include several different mounting means, or strap 22 may be specially adapted for mounting to one type of structure, and therefore, would only have the need for one mounting means. Preferably, there are three mounting means incorporated as a part of strap 22.

Mounting means 32 for mounting assembly 20 to door 34 of a vehicle includes tongue 36 protruding downward from upper end 24, tongue 36 and strap 22 defining hook 38, suction cup 40 having mushroom head 42, and clip means 44 for connecting suction cup 40 to upper end 24. Door 34 includes shiftable window 46 received in space 48. In a preferred embodiment, tongue 36 and clip means 44 are separated by a cross-sectional angle of between 90° and 180° as depicted in FIG. 14

Tongue 36 includes strap connecting first portion 50 and space engaging second portion 52. Tongue 36 is sized for engagement of space 48, more particularly, the dimensions of tongue 36 taper from first portion 50 towards a smaller second portion 52, as depicted in FIGS. 13–15.

Mounting means 32 may be used to mount assembly 20 to door 34 by clipping suction cup 40 onto clip means 44, inserting tongue 36 into space 4e and affixing suction cup 40 to window 46, as illustrated in FIG. 1. Preferably clip means 44 includes C-shaped clip 54 extending upward from upper end 24 of strap 22 for engaging mushroom head 42 of suction cup 40.

Figure 2:
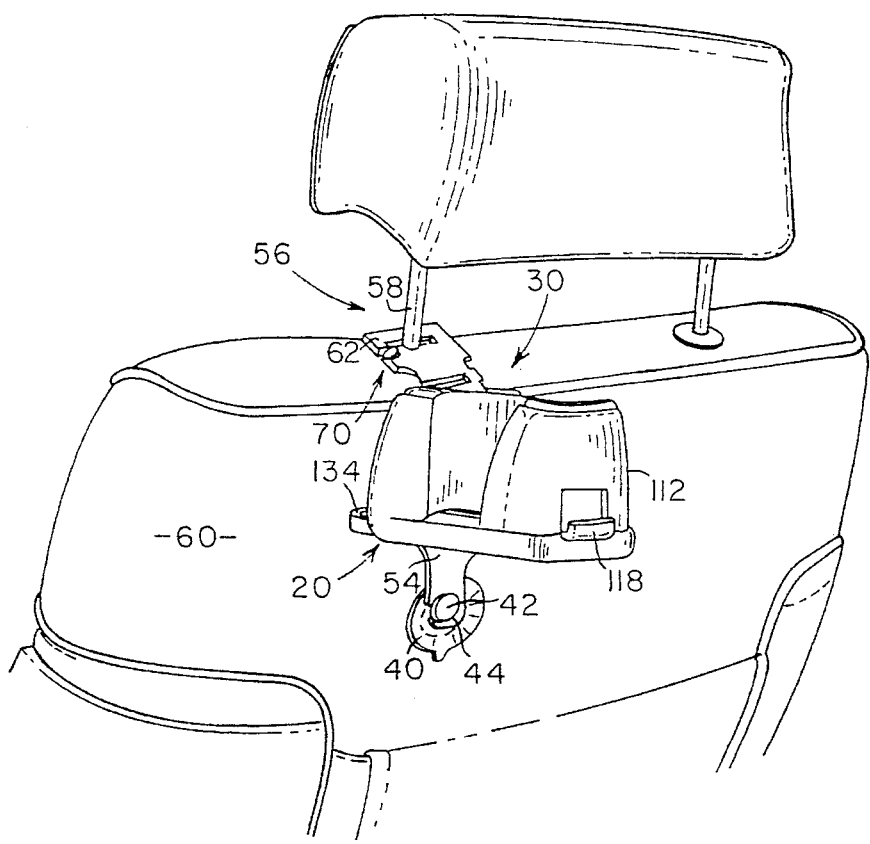
FIG. 2 is a perspective view of the cup holding assembly of FIG. 1, showing the strap reversed, and the assembly mounted on a headrest support with the leg member engaging the back of the seat.

Mounting means 56 for mounting assembly 20 to headrest support 58 of seat 60 of a vehicle includes headrest support mounting clip 62 changeable between open condition 64 and closed condition 66, defining aperture 68 when in closed condition 66, and retaining means 70 for retaining mounting clip 62 in closed condition 66. Mounting means 56 mounts assembly 20 to headrest support 58 by placing headrest support 58 through aperture 68 and retaining mounting clip 62 in closed condition 66, as illustrated in FIG. 2.

Mounting clip 62 is integrally formed of a resiliently flexible synthetic resin as part of lower end 26 of strap 22, and includes opposed first 72 and second 74 wall members and opposed hinge 76 and clasp 78 members. First 72 and second 74 wall members include arcuate recesses S0 and 82 defined in otherwise flat edges 84 and 86. Arcuate recesses S0 and 82 are sized for engagement of headrest support 58, allowing strap 22 to take a relatively vertical position for supporting cup holder 28 in an orientation which discourages tipping of the cup or other article placed on cup holder as depicted in FIG. 2.

Retaining means 70 includes clasp receiving opening having tabs 90 and 92, and clasp 78 having T-shaped locking member 94. Locking member 94 may be placed in opening 88 for engagement of tabs 90 and 92 thereby retaining locking member 94 in opening 88 and presenting closed condition 66 of mounting clip 62, until disengagement therefrom.

Figure 5:
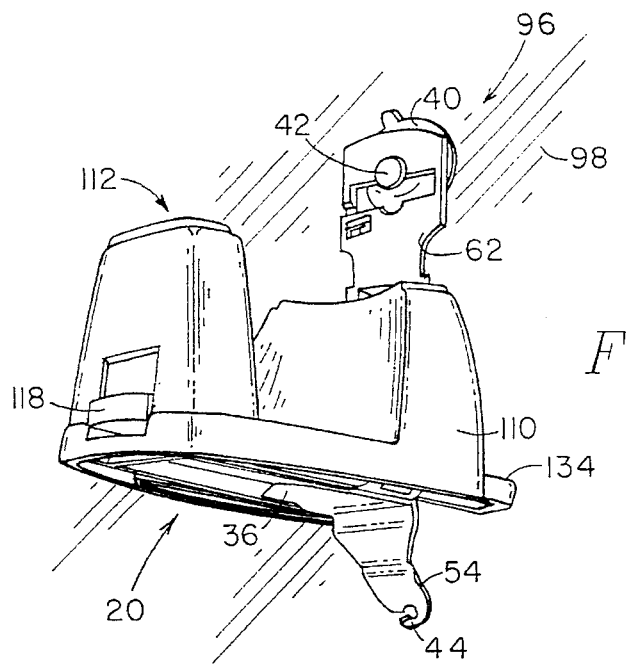
FIG. 5 is a further perspective view thereof, illustrating yet another angle.
Figure 4:
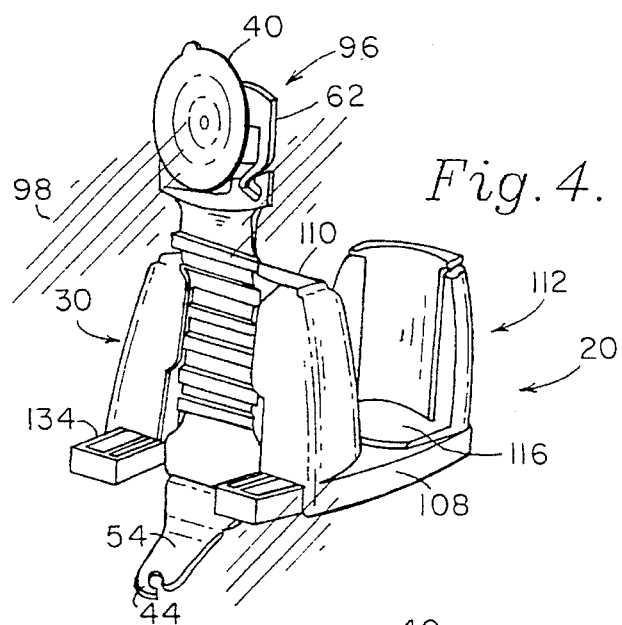
FIG. 4 is another perspective view thereof, illustrating the holder from a different angle.
Figure 3:
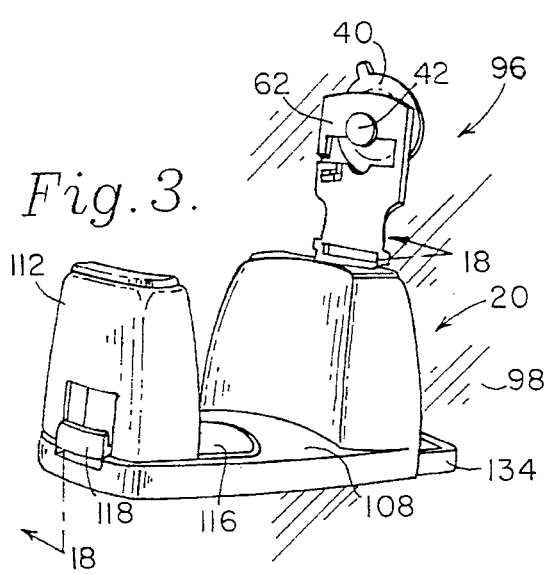
FIG. 3 is a perspective view of the cup holding assembly of FIG. 1, showing the strap reversed, and the assembly mounted on a window of a vehicle with the leg member engaging the window.
Figure 17:
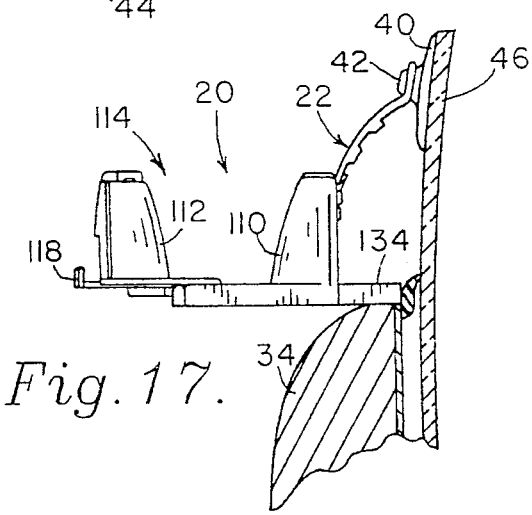
FIG. 17 is a right side view of the cup holder mounted on a door of a vehicle.

In use, the weight of a cup or other article which is placed on assembly 20 prevents locking member 94 from inconveniently disengaging from opening 88. Additionally, this structure allows assembly 20 to be resiliently affixed to headrest support 58, while allowing quick and convenient removal from headrest support Mounting means 96 for mounting assembly 20 to fixed window 98, such as the front windshield of a vehicle, or other window which is not shiftable, includes coupling structure 100 defined in arcuate recess S0 for coupling suction cup 40 to mounting clip 62, as illustrated in FIGS. 3–5.

Support means 30 includes notches 102 and 104 provided on cup holder 28 which engage strap 22 for supporting cup holder 28 on strap 22. Strap 22, which is substantially flat, and constructed of a synthetic resin material for flexibility, includes at least one transverse finger intermediate upper end 24 and lower end 26 sized for frictional engagement of notches 102 and 104. Finger 106 has a symmetric design relative to upper end 24 and lower end as depicted in FIG. 14, so that strap 22 is reversible, allowing upper end 24 and lower end 26 to be reversed with respect to cup holder 28. A plurality of transverse fingers 106, as illustrated in FIG.

11, may be provided on strap to allow adjustment of the height of cup holder 28 with respect to strap 22.

In a preferred embodiment, upper end 24 incorporates mounting means 32, while lower end 26 incorporates mounting means 56 and 96, thereby presenting strap 22 which may be positioned for support of cup holder 28 so that assembly 20 may be mounted on any of a number of interior vehicle structures.

Cup holder 28 includes base LOS and arms 110 and 112 defining cup receiving area 114. At least one of the arms, such as arm 112, may be adjustable so that the size of cup receiving area 114 may be adjusted for receiving cups of varying sizes.

Cup holder 28 includes inwardly concave fixed arm 110 integrally formed with base LOS, and inwardly concave adjustable arm 112 opposed from fixed arm 110 and having shiftable bottom plate 116, as depicted in FIGS. 6 and 9. These components are preferably made of impact-resistant plastic. A ratchet and pawl assembly is provided along the length of a guide structure for lateral movement of adjustable arm 112 relative to fixed arm 110. This rachet and pawl assembly operates in the same manner as does the ratchet and pawl assembly described in the '032 Patent. The ratchet and pawl assembly may be selectively locked and unlocked by depressing lever 118 for adjusting the lateral dimension of cup receiving area 114.

Notches 102 and 104 are formed in rearward face 120 of cup holder 28 and include vertical ridges 122, 124, 126, and 128, and horizontal ridge 130. When notches 102 and 104 receive transverse finger 106 of strap 22, ridges 122–130 frictionally engage finger 106 for retention of finger 106 in notches 102 and 104.

Cup holder 28 further includes a leveling means for adjusting the orientation of base 108 with respect to the vehicle. The leveling means includes leg member 134 adjustably mounted below base 108 for movement parallel to base 108 between retracted position 136 and an extended position. In retracted position 136, leg member 134 is withdrawn beneath base 108, while in the extended position 138, leg member 134 protrudes from base 108 for engagement of a vehicle structure, such as door 34, seat 60, or window 98.

The leveling means, as illustrated in FIG. 10, discloses base 108 including opposed interior compartments 140 and 142 for respectively receiving and guiding the movement of leg member 134. Leg member 134, is H-shaped and presents at least one surface engaging wall 144 connected at a right angle to a flat sliding wall 146, which is proximal to laterally extending channel guide track 148. Track 148 is sized to receive elongated guide member 150, which extends rearwardly from forward position 152 of base 108.

Rack 154 forms a portion of sliding wall 146 and faces inwardly to engage flexible pawl 156, which is spring biased towards rack 154. Button 158 is provided for selectively pivoting pawl 156 into and out of engagement with rack 154. Such a rack and pawl structure allows extension of leg member 134 without depressing button 158, while not allowing retraction of leg member 134 without pressing button 158, thereby preventing inadvertent retraction of leg member 134.

In operation, leg member 134 may be adjusted so that surface 146 engages the structure to which assembly 20 is mounted, thereby orienting base 108 so that it is level with respect to the earth. Leg member 134 presents surface 146 which is sufficiently large so as to provide a stabilizing structure in addition to the mounting means employed, thereby resisting movement of assembly 20 while common vehicular acceleration forces, such as stopping, starting, and turning, are exerted on assembly 20.

Those skilled in the art will understand that the preferred embodiments, as described hereinabove, may be subjected to obvious modifications without departing from the scope and spirit of the invention. Accordingly, the inventors hereby state their intention to rely upon the Doctrine of Equivalents to protect their full rights in the invention.

We claim:

1. A cup holding assembly for use in a vehicle having a door provided with a window and a space for receiving the window, the assembly comprising:

a strap including opposed upper and lower ends;

a cup holder including support means for coupling said cup holder with said strap to support said cup holder on said strap; and a mounting means provided adjacent said upper end of said strap for mounting said strap on the door of the vehicle, said mounting means including a tongue protruding downward from said upper end of said strap to define a hook by which said strap and said cup holder are suspended, said tongue being configured for insertion into the space of the door, a suction cup, and a clip means for connecting said suction cup to said upper end of said strap distally from said hook relative to the cup holder so that said suction cup may be affixed to the window to support said strap and holder on the door when said tongue is inserted into the space of the door.

2. The assembly as set forth in claim 1, wherein said clip means includes a C-shaped clip formed in said upper end of said strap.

3. The assembly as set forth in claim 1, wherein said tongue includes a strap connecting first portion and a space engaging second portion, the width of said tongue tapering from said strap connecting first portion towards said second portion.

4. The assembly as set forth in claim 1, wherein said clip means and said tongue are separated by an angle ranging between about 90° and 180°.

5. A cup holding assembly for use in a vehicle having a door provided with a window and a space for receiving the window, the assembly comprising:

a strap including opposed upper and lower ends, said strap being substantially flat and including at least one transverse finger intermediate said upper and lower ends of said strap;

a cup holder including support means for receiving said finger to couple said cup holder with said strap for supporting said cup holder on said strap; and a mounting means provided adjacent said upper end of said strip for mounting said strap on the door of the vehicle, said mounting means including a tongue protruding downward from said upper end of said strap to define a hook by which said strap and said cup holder are suspended, said tongue being configured for insertion into the space of the door, a suction cup, and a clip means for connecting said suction cup to said upper end of said strap above said hook so that said suction cup may be affixed to the window to support said strap and holder on the door.

6. The assembly as set forth in claim 5, wherein said support means includes notches in said cup holder.

7. The assembly as set forth in claim 6, wherein said strap includes a plurality of transverse fingers intermediate said upper and lower ends of said strap permitting height adjustment of said cup holder with respect to said strap.

8. The assembly as set forth in claim 1, wherein said cup holder includes a base, a fixed arm, and a movable arm.

9. The assembly as set forth in claim 1, wherein said cup holder includes a base and is configured so that said base extends at an angle with respect to the door when the assembly is mounted on the door, said cup holder including a leveling means for altering the angle of said base with respect to the door.

10. The assembly as set forth in claim 9, wherein said leveling means includes a leg member adjustably mounted on said base for movement parallel to said base between a retracted position in which said leg member is withdrawn beneath said base and an extended position in which said leg protrudes from said base for engaging the door, said leg configured for bearing against the door when extended to alter the angle of said base.

11. A cup holding assembly for use in a vehicle having a headrest support and a door provided with a window and a space for receiving the window, the assembly comprising:

a strap including opposed upper and lower ends;

a cup holder including support means for coupling said cup holder with said strap to support said cup holder on said strap, said strap being reversible so that said upper and lower ends may be reversed with respect to said cup holder;

a first mounting means provided adjacent said upper end of said strap for mounting said strap on the door of the vehicle, said first mounting means including
 a tongue protruding downward from said upper end of said strap to define a hook by which said strap and said cup holder are suspended, said tongue being configured for insertion into the space of the door,
 a suction cup, and
 a clip means for connecting said suction cup to said upper end of said strap above said hook so that said suction cup may be affixed to the window to support said strap and holder on the door; and a second mounting means provided adjacent to said lower end of said strap for mounting said strap on the headrest support of the vehicle, said second mounting means including a headrest support mounting clip changeable between an open and a closed condition, said mounting clip defining an aperture in said closed condition.

12. The assembly as set forth in claim 11, said headrest support mounting clip including retaining means for retaining said mounting clip in said closed condition.

13. A cup holding assembly for use in a vehicle having a door provided with a window and a space for receiving the window, and a headrest support, the assembly comprising:

a strap including opposed upper and lower ends;

a cup holder including support means for supporting said cup holder on said strap;

a first mounting means for mounting said strap on the headrest support of the vehicle said first mounting means including a headrest support mounting clip adjacent to said upper end of said strap changeable between an open and a closed condition, said mounting clip defining an aperture in said closed condition;

a second mounting means provided on said mounting clip for mounting said strap to the window of the vehicle including a suction cup, and said mounting clip having a coupling structure formed in said mounting clip for coupling said suction cup to said mounting clip so that said suction cup may be affixed to the window of the vehicle to support said strap and said cup holder on the window; and a retaining means for retaining said mounting clip in said closed condition.

14. The assembly as set forth in claim 13, wherein said strap is substantially flat and includes at least one transverse finger intermediate said upper and lower ends of said strap permitting connection of said strap to said cup holder.

15. The assembly as set forth in claim 14, wherein said support means includes notches in said cup holder for receiving said finger of said strap.

16. The assembly as set forth in claim 15, wherein said strap includes a plurality of transverse fingers intermediate said upper and lower ends of said strap permitting height adjustment of said cup holder with respect to said strap.

17. The assembly as set forth in claim 13, wherein said cup holder includes a base, a fixed arm, and a movable arm.

18. The assembly as set forth in claim 17, wherein said cup holder is configured so that the base extends at an angle with respect to the door when the assembly is mounted on the door, said cup holder including a leveling means for altering the angle of said base with respect to the door.

19. The assembly as set forth in claim 18, wherein said leveling means includes a leg member adjustably mounted on said base for movement parallel to said base between a retracted position in which said leg is withdrawn beneath said base and an extended position in which said leg protrudes from said base for engaging the door, said leg configured for bearing against the door when extended to alter said orientation of said base.

20. The assembly as set forth in claim 13, wherein said strap is reversible so that said upper and lower ends may reversed with respect to said cup holder.

21. The assembly as set forth in claim 20, wherein said assembly includes a mounting means provided adjacent said upper end of said strap for mounting said strap on the door of the vehicle, said mounting means including
 a tongue protruding downward from said upper end of said strap and sized for receipt in the space of the door to define a hook by which said strap and holder are suspended, and
 a clip means for connecting said suction cup to said upper end of said strap above said hook so that said suction cup may be affixed to the window to support said strap and said cup holder on the door.

22. The assembly as set forth in claim 21, wherein said clip means includes a C-shaped clip formed in said upper end of said strap.

23. The assembly as set forth in claim 21, wherein said tongue includes a strap connecting first portion and a space engaging second portion, the width of said tongue tapering from said strap connecting first portion towards said second portion.

24. The assembly as set forth in claim 21, wherein said clip means and said tongue are separated by an angle ranging between about 90° and 180°.

* * * * *